(12) United States Patent
Nakai et al.

(10) Patent No.: US 7,580,025 B2
(45) Date of Patent: Aug. 25, 2009

(54) ELECTROPHORETIC DISPLAY DEVICE

(75) Inventors: Yutaka Nakai, Yokohama (JP); Shintaro Enomoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 341 days.

(21) Appl. No.: 10/897,077

(22) Filed: Jul. 23, 2004

(65) Prior Publication Data

US 2005/0105161 A1    May 19, 2005

(30) Foreign Application Priority Data

Jul. 25, 2003   (JP)   ............... 2003-202123

(51) Int. Cl.
*G09G 3/34* (2006.01)
(52) U.S. Cl. ..................................... 345/107
(58) Field of Classification Search ................. 345/107; 359/296
See application file for complete search history.

(56) References Cited

U.S. PATENT DOCUMENTS 6,120,588 A    9/2000  Jacobson

2003/0070929 A1*  4/2003  Shannon et al. ............. 204/606
2004/0011651 A1*  1/2004  Becker et al. ............... 204/547
2004/0119680 A1*  6/2004  Daniel et al. ................ 345/107
2006/0139304 A1*  6/2006  Goden ......................... 345/107

FOREIGN PATENT DOCUMENTS

JP            2002-40967         2/2002

* cited by examiner

*Primary Examiner*—Amr Awad
*Assistant Examiner*—Randal Willis
(74) *Attorney, Agent, or Firm*—Oblon, Spivak, McClelland, Maier & Neustadt, P.C.

(57) ABSTRACT

An electrophoretic display device comprises a first substrate and a second substrate positioned to face each other. A first electrode is so mounted to the first substrate as to face second and third electrodes. The second and third electrodes have an area smaller than that of the first electrode. Also, the distance between the second and third electrodes is set shorter than the distance between the second and first electrodes and the distance between the third and electrodes. A suspension dispersing charged fine particles in an insulating liquid medium is interposed between the first electrode and the second and third electrodes. An AC voltage is applied between the second and third electrodes, and a DC voltage is applied between the first electrode and the second and third electrodes. Thus, the migration of charged fine particles are controlled in accordance with the dielectrophoretic and electrophoretic forces.

14 Claims, 3 Drawing Sheets

ELECTROPHORETIC DISPLAY DEVICE

CROSS-REFERENCE TO RELATED APPLICATIONS

This application is based upon and claims the benefit of priority from prior Japanese Patent Application No. 2003-202123, filed Jul. 25, 2003, the entire contents of which are incorporated herein by reference.

BACKGROUND OF THE INVENTION

1. Field of the Invention

The present invention relates an electrophoretic display device, particularly, to an electrophoretic display device that can be driven with low power consumption.

2. Description of the Related Art

A reflective display device is low in its power consumption and permits lessening the burden given to the eye of the observer and, thus, is expected to be widely propagated in future. An electrophoretic display device is known to the art as one of the reflective display devices. The electrophoretic display device comprises a pair of electrodes and a suspension loaded in the space between the paired electrodes. The suspension is prepared by dispersing electrophoretic particles having electrical charges in an insulating liquid material. An electric field is applied across the suspension via the paired electrodes. As a result, the electrophoretic particles are allowed to migrate onto the electrode having a polarity opposite to that of the electrical charge of the electrophoretic particles so as to permit the pixel to display a specified color.

In the electrophoretic display device, the electrophoretic particles are colored, and the contrasting color relative to the color of the electrophoretic particles is developed by the medium having dyes dissolved therein. To be more specific, where the electrophoretic particles are attached to the surface of one electrode positioned closer to the observer, the color of the electrophoretic particles is observed. Also, where the electrophoretic particles are attached to the surface of the other electrode positioned remoter from the observer, the color of the electrophoretic particles is shielded by the medium so as to permit the color of the medium to be observed.

The electrophoretic display device is advantageous in that the viewing angle is wide, the contrast is high, and the power consumption is low. However, the electrophoretic display device gives rise to a serious problem that it is essentially impossible to achieve both a high reflectance, i.e., a high brightness, and a high contrast simultaneously because, for example, the die dissolved in the medium may be attached to the particles to color the particles or the colored medium may be entered in the space between the surface of the electrode and the electrophoretic particles attached on the electrode.

A measure against the difficulty noted above is proposed in Japanese Patent Disclosure (Kokai) No. 9-211499 and Japanese Patent Disclosure No. 11-202804. Specifically, proposed in these patent documents is an electrophoretic display device that displays a color by using a transparent medium. In the system disclosed in these patent documents, colored particles are allowed to migrate onto the entire region of the pixel electrode having a size substantially equal to the pixel size so as to display a first color, e.g., black. Also, colored particles are collected on the non-pixel portion or a portion, which has a small area, of the pixel, with the result that the transmitting state of the pixel portion is maintained. As a result, displayed is a second color, e.g., white. In this case, a dye is not dissolved in the medium and, thus, the medium exhibits a high stability. Also, it is possible to achieve a good white display by controlling the scattering characteristics of the reflective electrode.

On the other hand, it is disclosed in U.S. Pat. No. 6,120,588 that fine particles are allowed to migrate by the force other than the electrophoretic force so as to display the color. In the method disclosed in this prior art, an AC electric field is applied across the electrode positioned remoter from the observing surface. As a result, the diffused fine particles formed of a dielectric material are selectively attracted toward the space between a pair of electrodes. It follows that the color of the fine particles left on the observing surface is displayed. In the dielectrophoretic display device utilizing the particular method, pluralities of different kinds of fine particles are selectively attracted downward. Such being the situation, the dielectric characteristics of the colored particles are set to differ from each other, and the plural kinds of the fine colored particles are controlled by the frequency of the AC electric field applied thereto.

However, since the electrophoretic particles are allowed to migrate at a velocity directly proportional to the intensity of the electric field in the electrophoresis, there is no threshold value in the electric field at which migration of the electrophoretic particles is started. Such being the situation, it is said to be substantially difficult for the simple matrix driving or the memory characteristics to be developed. Allowing the electrophoretic particles to be adsorbed on the surface of the electrode can generate the threshold value. However, it is difficult to control the adsorption force so as to give rise to the problem that the threshold value is rendered widely non-uniform or fails to be stabilized over a long period of time.

On the other hand, the display device utilizing the dielectrophoresis is defective in that the response speed is low because of the lack in the restoring force for bringing the fine particles attracted toward the side remoter from the observing surface by the application of an AC electric field back to the side of the observing surface. In addition, since there is no threshold value in the dielectric migrating force under a certain set frequency, it is difficult to cause the fine particles of a specified color to be allowed to migrate selectively with a high accuracy so as to make it difficult to achieve a color display device. It should also be noted that it is necessary to control simultaneously the voltage level and the frequency of the AC voltage applied to a pair of electrodes mounted to each pixel, with the result that a difficulty is also generated in respect of the driving of the display device.

BRIEF SUMMARY OF THE INVENTION

An object of the present invention is to provide an electrophoretic display device, which permits easily generating a threshold value for allowing the charged fine particles to migrate and which can be driven with a small power consumption.

According to an aspect of the present invention, there is provided an electrophoretic display device, comprising:

a first substrate and a second substrate positioned to face each other;

a first electrode mounted to the first substrate;

a second electrode and a third electrode, which are positioned to face the first electrode, each of the second electrode and the third electrode having an area smaller than that of the first electrode, and the distance between the second electrode and the third electrode being set shorter than each of the distance between the second electrode and the first electrode and the distance between the third electrode and the first electrode;

a suspension layer received in a space between the first electrode and each of the second and third electrodes, including insulating liquid medium and charged fine particles dispersed in the insulating liquid medium; and a power source section configured to apply an AC voltage between the second electrode and the third electrode and apply a DC voltage between the first electrode and each of the second and third electrodes.

According to another aspect of the present invention, there is provided a driving method of an electrophoretic display device including:

a first substrate and a second substrate positioned to face each other;

a first electrode mounted to the first substrate;

a second electrode and a third electrode, which are positioned to face the first electrode, each of the second electrode and the third electrode having an area smaller than that of the first electrode, and the distance between the second electrode and the third electrode being set smaller than each of the distance between the second electrode and the first electrode and the distance between the third electrode and the first electrode; and a suspension layer received in a space between the first electrode and the second and third electrodes and prepared by dispersing charged fine particles in an insulating liquid medium;

the driving method comprising:

applying an AC voltage between the second and third electrodes so as to impart a dielectrophoretic force to the charged fine particles, thereby restricting the charged fine particles to the second and third electrodes; and applying a DC voltage between the first electrode and each of the second and third electrodes so as to impart an electrophoretic force opposing the restriction to the charged fine particles, thereby permitting the charged fine particles to be allowed to migrate toward the first electrode.

DETAILED DESCRIPTION OF THE INVENTION

Electrophoretic display devices for some embodiments of the present invention will now be described in detail with reference to the accompanying drawings.

First Embodiment

An electrophoretic display device for a first embodiment of the present invention will now be described first with reference to FIG. 1. The electrophoretic display device shown in FIG. 1 comprises a first substrate and a second substrate. A single electrode is mounted to the first substrate, and two electrodes are mounted to the second substrate. The electrophoretic display device of the particular construction is capable of displaying a first color and a second color that is to be contrasted with the first color by utilizing both the electrophoretic phenomenon and the dielectrophoretic phenomenon.

Figure 1:
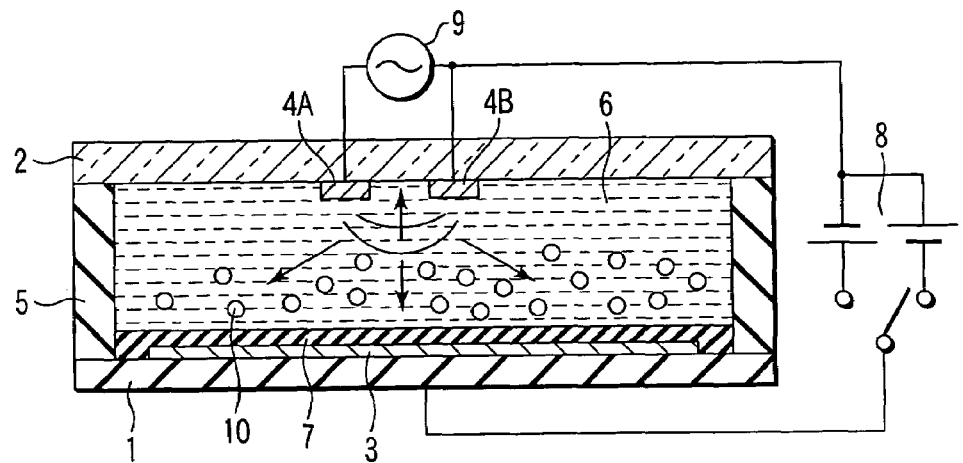
FIG. 1 is a cross sectional view schematically showing the construction of a single pixel included in an electrophoretic display device for a first embodiment of the present invention.

FIG. 1 is a cross sectional view schematically showing the construction of a single pixel included in the electrophoretic display device for the first embodiment of the present invention. In the actual electrophoretic display device, a large number of pixels each constructed as shown in FIG. 1 are arranged to form a two dimensional matrix, thereby forming a display section for displaying an image.

In the electrophoretic display device shown in FIG. 1, a first substrate 1 and a second substrate 2 are arranged to face each other, and partition walls 5 are formed between these substrates 1 and 2 in a manner to surround each pixel. Also, a pixel region partitioned by the first substrate 1, the second substrate 2 and the partition walls 5 is loaded with an insulating liquid medium 6. The insulating liquid medium 6 is transparent, and charged fine particles 10, which are colored, are dispersed in the insulating liquid medium 6 under the state that the surface of the fine particle 10 is charged. In the electrophoretic display device shown in FIG. 1, a space for a suspension layer is defined by the partition walls 5, the insulating liquid medium 6, and the colored and charged fine particles 10. Also, within each pixel surrounded by the partition walls 5, a first electrode 3 is mounted to the first substrate 1, and a second electrode 4A and a third electrode 4B are mounted to the second substrate 2. Further, a DC power source 8 for applying a DC voltage between the first electrode 3 and each of the second and third electrodes 4A, 4B is connected to each pixel. Still further, an AC power source 9 for applying an AC voltage between the second electrode 4A and the third electrode 4B is also connected to each pixel.

It is desirable for an insulating film to be formed on each of the first electrode 3, the second electrode 4A and the third electrode 4B. It is desirable to form an insulating film for controlling the adsorption power for allowing the colored and charged fine particles 10 to be adsorbed on these electrodes. However, it is not absolutely necessary to form such an insulating film. An insulating film 7 alone formed on the surface of the first electrode 3 is shown in FIG. 1 for simplifying the drawing.

The display operation performed by the electrophoretic display device shown in FIG. 1 will now be described.

In the electrophoretic display device shown in FIG. 1, each pixel is optically turned on and off so as to permit the color of the colored and charged fine particles 10 to be displayed. Also, the electrophoretic display device can display a contrasting color differing from the color of the charged fine particles 10. To be more specific, the colored and charged fine particles 10 are allowed to migrate onto the entire first electrode 3 having a size substantially equal to the pixel size, with the result that the color of the charged fine particles 10 is displayed. On the other hand, where the colored and charged fine particles 10 are allowed to migrate onto the portions of the second electrode 4A and the third electrode 4B, a transmitting state is maintained in the pixel portion, with the result that a contrasting color differing from the color of the charged fine particles 10, e.g., the contrasting color of a white color, is displayed by the first electrode 3, etc. In the particular display mode, the migration of the colored fine particles 10, which are charged positive or negative, is controlled by the voltage application from the DC power source 8 and the AC power source 9.

In the first step, a DC voltage is applied from the DC power source 8 between the first electrode 3 and each of the second and third electrodes 4A, 4B. In accordance with the direction of the electric field generated by the voltage application, the electrophoretic force is caused to act on the colored and charged fine particles 10 dispersed in the insulating liquid medium 6. As a result, the colored and charged fine particles 10 are allowed to migrate toward the first electrode 3 or toward the second and third electrodes 4A and 4B. Where the colored and charged fine particles 10 are allowed to migrate toward the first electrode 3, the colored and charged fine particles 10 can be observed from an upper portion of the drawing, which provides an observing plane, with the result that the color of the colored and charged fine particles 10 is displayed. On the other hand, where the colored and charged fine particles 10 are allowed to migrate toward the second electrode 4A and the third electrode 4B, the colored and charged fine particles 10 are shielded by the second electrode 4A and the third electrode 4B, with the result that another contrasting color is displayed. It should be noted that, where the first electrode 3 is transparent and a white reflecting body or a diffusing reflective plate is formed below the first substrate 1, the white color is displayed as another contrasting color noted above. If the reflecting body has another color that is other than white, the another color noted above can also be displayed. Also, where the first electrode 3 is formed of a reflective material, the white color can also be displayed similarly.

Incidentally, where the first electrode 3 is transparent, it is possible for any of the upper portion and the lower portion of the drawing to provide the observing plane. If the area of each of the second electrode 4A and the third electrode 4B is set smaller than the area of the first electrode 3, it is possible to increase the contrast ratio between the colored display and the transparent display. Since the ratio in area of the first electrode 3 to the sum of the second electrode 4A and the third electrode 4B is substantially equal to the contrast ratio, it is desirable for the area of the first electrode 3 to be not smaller than 5 times as large as the area of the second electrode 4A or the area of the third electrode 4B. Also, it is possible for the second electrode 4A and the third electrode 4B to have the same area or different areas. Preferably, the second electrode 4A and the third electrode 4B should be different from each other in area and shape. If the second electrode 4A and the third electrode 4B differ from each other in area and shape, it is possible to make non-uniform the intensity of the electric field generated between the second electrode 4A and the third electrode 4B. It follows that it is possible to intensify the function of the dielectrophoresis described herein later, even if the AC voltage level is not elevated. Also, the second electrode 4A and the third electrode 4B are patterned in the patterning step to have an irregularity on the surface. It should be noted that, when the second electrode 4A and the third electrode 4B are put under an electric field, the electric field is concentrated on the irregular portions on the surfaces of the second electrode 4A and the third electrode 4B. As a result, the intensity of the electric field is rendered non-uniform so as to intensify the function of the dielectrophoresis.

It should also be noted that, if an AC voltage supplied from the AC power source 9 is applied between the second electrode 4A and the third electrode 4B, an interaction producing a dielectrophoretic force is generated between the electrodes 4A and 4B so as to attract the colored and charged fine particles 10. If the distance between the second electrode 4A and the third electrode 4B is larger than a prescribed distance, the intensity of the interaction between the electrodes 4A and 4B is rendered lower than that of the interaction between the first electrode 3 and the second electrode 4A or that of the interaction between the first electrode 3 and the third electrode 4B. As a result, a majority of the lines of electric force extending from the second electrode 4A or the third electrode 4B are allowed to extend to reach the first electrode 3. It follows that the dielectrophoretic force is unlikely to be generated between the second electrode 4A and the third electrode 4B. Such being the situation, it is necessary for the distance between the second electrode 4A and the third electrode 4B to be smaller than a prescribed distance. If the distance between the second electrode 4A and the third electrode 4B is set to fall within a prescribed range, an electric field having distribution of a higher intensity, compared with the intensity of the electric field in the peripheral region, is generated between the second electrode 4A and the third electrode 4B, and the dielectrophoretic force is generated by the electric field thus generated. To be more specific, the distance between the second electrode 4A and the third electrode 4B is set shorter than any of the distance between the first electrode 3 and the second electrode 4A and the distance between the first electrode 3 and the third electrode 4B. Where the electrodes 4A and 4B are arranged under the condition given above, the dielectrophoretic force for allowing the colored and charged fine particles 10 to be allowed to migrate, the dielectrophoretic force being proportional to the value K determined by formula (1) given below, is generated. To be more specific, the dielectrophoretic force noted above is generated under the condition that the real number portion Re included in formula (1) and determined in accordance with the dielectric characteristics of the colored and charged fine particles 10 is positive. As a result, the colored and charged fine particles 10 are allowed to migrate toward that region of the electric field having a higher intensity.

$$K = Re[(\in_2 - \in_1)/(\in_2 + 2\in_1)] \quad (1)$$

where $\in_1$ denotes the complex permittivity of the insulating liquid medium, and $\in_2$ denotes the complex permittivity of the colored and charged fine particles. The value of K corresponds to the real number portion Re in formula (1), and the generated dielectrophoretic force is proportional to the value K.

If the complex permittivity of each of the colored and charged fine particles 10 and the insulating liquid medium 6 is controlled, it is possible to generate the dielectrophoretic force for attracting the colored and charged fine particles 10 toward the region between the second electrode 4A and the third electrode 4B. Both the electrophoretic force, which is dependent on the amount of electric charge of the colored and charged fine particles 10, and the dielectrophoretic force, which is not dependent on the amount of the electric charge of the colored and charged fine particles 10 and is dependent on the complex permittivity, are exerted on the colored and charged fine particles 10. It follows that the resultant force of the electrophoretic force and the dielectrophoretic force acts on the colored and charged fine particles 10. Since the colored and charged fine particles 10 are allowed to migrate uniformly within the pixel, it is desirable for the second electrode 4A and the third electrode 4B to be arranged in the central portion of the pixel. However, it is possible to arrange the second electrode 4A and the third electrode 4B anywhere within the pixel as far as the uniform migration of the colored and charged fine particles 10 is not impaired. Also, in the case of arranging a plurality of pairs of the second electrode 4A and the third electrode 4B, attentions should be paid to the situation that it is not necessarily appropriate to arrange these plural pairs of the electrodes in the central portion of the pixel.

If a DC voltage is applied between the first electrode 3 and each of the second and third electrodes 4A, 4B in the display device described above, generated is an electrophoretic force for allowing the colored and charged fine particles 10 to be allowed to migrate toward the first electrode 3. Also, if an AC voltage is applied between the second electrode 4A and the third electrode 4B at the same time, a dielectrophoretic force is spatially generated to allow the colored and charged fine particles 10 to migrate toward the region between the second electrode 4A and the third electrode 4B. It should be noted that the dielectrophoretic force is generated by the change in the spatial intensity of the electric field. It follows that, if the colored and charged fine particles 10 are allowed to migrate away from the region in the vicinity of the second electrode 4A or the third electrode 4B, the change in the intensity of the electric field is rapidly weakened. As a result, the dielectrophoretic force, which is proportional to the differential of the square of the intensity of the electric field, is also weakened extremely. Such being the situation, the region in which the dielectrophoretic force is generated is limited to the region in the vicinity of the second electrode 4A and the third electrode 4B.

The colored and charged fine particles 10 are allowed to migrate by the interaction between the electrophoretic force and the dielectrophoretic force noted above, with the result that the color of the colored and charged fine particles 10 and its contrasting color are displayed in the display device. The display operation of the particular display device will now be described.

First of all, suppose the state that the electrophoretic force collects fine particles on the region in the vicinity of the second electrode 4A and the third electrode 4B. Under this state, a potential is imparted to the first electrode 3 so as to generate the electrophoretic force directed toward the first electrode 3. However, it is impossible for the colored and charged fine particles 10 to be allowed to migrate toward the first electrode 3 unless the electrophoretic force is rendered stronger than the dielectrophoretic force. In other words, the colored and charged fine particles 10 are attracted toward the first electrode 3 only in the case where voltage is applied to permit the electrophoretic force to be rendered stronger than the dielectrophoretic force. Such being the situation, it is apparent that it is possible to set the threshold value in respect of the migration of the colored and charged fine particles 10 by utilizing both the electrophoretic force and the dielectrophoretic force.

Then, suppose the state that voltage is applied to the first electrode 3 in a manner to permit the electrophoretic force to be rendered stronger than the dielectrophoretic force so as to cause substantially all the colored and charged fine particles 10 to be attracted toward the first electrode 3. If voltage is applied under the particular state to the first electrode 3 in a manner to permit the colored and charged fine particles 10 to be repelled by the first electrode 3 so as to be allowed to migrate away from the first electrode 3, generated is the electrophoretic force that causes the colored and charged fine particles 10 to migrate toward the second electrode 4A or the third electrode 4B. By the electrophoretic force thus generated, the colored and charged fine particles 10 are allowed to migrate away from the first electrode 3 so as to be attracted toward the region in the vicinity of the second electrode 4A and the third electrode 4B. The colored and charged fine particles 10 thus attracted are further attracted toward the region in the vicinity of the second electrode 4A and the third electrode 4B by the dielectrophoretic force in the vicinity of the second electrode 4A and the third electrode 4B. Then, the dielectrophoretic force acting between the second electrode 4A and the third electrode 4B restricts the colored and charged fine particles 10.

Incidentally, in order to generate the dielectrophoretic force, it is necessary for the AC voltage having a frequency falling within a range of between scores of Hz and 1 MHz including 50 to 60 Hz, which is equal to the frequency of the commercial electric power, to be kept applied between the second electrode 4A and the third electrode 4B. It should be noted in this connection that the power consumption required for applying the AC voltage is proportional to the capacitance and to the square of the voltage. However, the electrostatic capacitance between the second electrode 4A and the third electrode 4B is small, compared with the pixel capacitance. Also, it suffices for the electric field generated between the second electrode 4A and the third electrode 4B to be small, i.e., about 1~3 V/micron. It follows that the electric power required for generating the AC electric field is very small. Such being the situation, the power consumption required for allowing the AC voltage to be kept applied can be said to be substantially negligible.

Also, the colored and charged fine particles 10 collected in the vicinity of the second electrode 4A and the third electrode 4B have an electric charge and, thus, also exhibit the electrophoretic properties under a relatively low frequency. As a result, the colored and charged fine particles 10 are somewhat allowed to migrate in accordance with the AC electric field so as to be vibrated. Such being the situation, it is possible to prevent the impurity ions present in the insulating liquid medium 6 from being distributed unevenly and to prevent the colored and charged fine particles 10 from being agglomerated by applying an AC electric field.

Where the colored and charged fine particles 10 are allowed to migrate toward the first electrode 3, the colored and charged fine particles 10 are positioned at least a prescribed distance away from the second electrode 4A or the third electrode 4B. It follows that the dielectrophoretic force does not act on the colored and charged fine particles 10, though the colored and charged fine particles 10 are somewhat diffused by the Brownian movement even under the state that the electrophoretic force is lowered to zero. Also, it is possible for the colored and charged fine particles 10 that are allowed to migrate toward the first electrode 3 to be slightly affected by the electrophoretic force under the influence of the very low AC voltage applied between the second electrode 4A and the third electrode 4B, with the result that the colored and charged fine particles 10 noted above are slightly vibrated. The very small vibration caused by the electrophoretic force prevents the colored and charged fine particles 10 from being adsorbed on each other and from being agglomerated.

Also, the electrophoretic force need not be completely lowered to zero on the average, and it is possible to induce a slight electrophoretic force directed toward the first electrode 3. For example, where the colored and charged fine particles 10 are attracted to the region in the vicinity of the second electrode 4A and the third electrode 4B, no problem is generated even if the electrophoretic force is induced as far as the electrophoretic force does not exceed the force generated by the dielectrophoresis. Also, where the colored and charged fine particles 10 are attracted toward the first electrode 3, it is possible to prevent the colored and charged fine particles 10 from being diffused from the first electrode 3 by continuing a slight induction of the electrophoretic force while preventing stably the colored and charged fine particles 10 from being allowed to migrate away from the first electrode 3 and while suppressing the deterioration of the colored and charged fine particles 10 caused by the DC voltage application.

Incidentally, the first embodiment described above is directed to the case where two electrodes, i.e., the second electrode 4A and the third electrode 4B, are arranged in order to generate a dielectrophoretic force. However, the first embodiment is not limited to the particular case. For example, it is possible to arrange a plurality of pairs the second electrode 4A and the third electrode 4B. Also, where the colored and charged fine particles 10 are dispersed at a high concentration, it is necessary for the second electrode 4A and the third electrode 4B to have reasonably large areas while ensuring the contrast ratio in the pixel display because it is difficult to collect all the colored and charged fine particles 10 in the vicinity of the second electrode 4A and the third electrode 4B.

It should also be noted that the electrophoretic display device for the first embodiment of the present invention also permits display of an intermediate tone. In general, it is unavoidable for the amount of the electric charge and the dielectric properties of the colored and charged fine particles 10 to have a distribution in view of the manufacturing process of the colored and charged fine particles 10. Under the circumstances, it is possible to perform the display of the intermediate tone by controlling the amount of the colored and charged fine particles 10 that are allowed to migrate from the second and third electrodes 4A, 4B toward the first electrode 3 based on the potential difference between each of the second and third electrodes 4A, 4B and the first electrode 3. To be more specific, where the potential difference between these electrodes assumes a certain value, the colored and charged fine particles 10 alone having a stronger electrophoretic force are allowed to migrate toward the first electrode 3 because of the balance between the electrophoretic force and the dielectrophoretic force. It is important to note that the amount of the colored and charged fine particles 10 that are allowed to migrate toward the first electrode 3 can be controlled by controlling the potential difference noted above so as to make it possible to achieve the display of the intermediate tone. It is possible to control the balance noted above by controlling the voltage level or the frequency of the AC voltage applied between the second electrode 4A and the third electrode 4B, though it is more convenient to control the potential of the first electrode 3.

Seecond Embodiment

An electrophoretic display device according to a second embodiment of the present invention will now be described with reference to FIG. 2.

Figure 2:
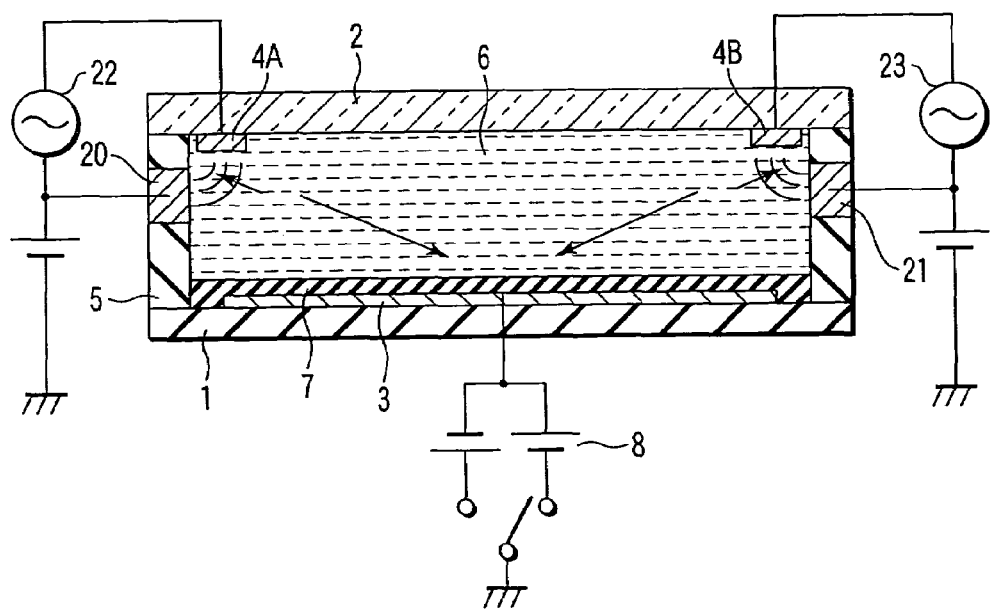
FIG. 2 is a cross sectional view schematically showing the construction of a single pixel included in an electrophoretic display device for a second embodiment of the present invention.

FIG. 2 schematically shows the construction of the electrophoretic display device according to the second embodiment of the present invention, in which the substantial aperture rate is increased in the case where a discolored state is provided by collecting the colored and charged fine particles in a part of the pixel. The following description covers only those portions of the electrophoretic display device, which differ in construction from the display device shown in FIG. 1, and the similar portions, or the members of the electrophoretic display devices are denoted by the same reference numerals throughout FIGS. 1 and 2 so as to avoid the overlapping description.

FIG. 2 is a cross sectional view schematically showing the construction of a single pixel included in the electrophoretic display device according to the second embodiment of the present invention.

The electrophoretic display device shown in FIG. 2 differs from the electrophoretic display device shown in FIG. 1 in that, in the display device shown in FIG. 2, the second electrode 4A and the third electrode 4B are arranged in the peripheral region in the pixel. Also, a fifth electrode 20 is arranged in the vicinity of the second electrode 4A, and a sixth electrode 21 is arranged in the vicinity of the third electrode 4B.

In the electrophoretic display device shown in FIG. 2, an AC voltage supplied from a first AC power source 22 is applied between the second electrode 4A and the fifth electrode 20. Likewise, an AC voltage supplied from a second AC power source 23 is applied between the third electrode 4B and the sixth electrode 21. It should also be noted that each of the distance between the second electrode 4A and the fifth electrode 20 and the distance between the third electrode 4B and the sixth electrode 21 is set shorter than the distance between the first electrode 3 and any of the second electrode 4A, the third electrode 4B, the fifth electrode 20 and the sixth electrode 21. The dielectrophoretic force is generated by the application of the AC voltage so as to cause the colored and charged fine particles 10 to be attracted to the region in the vicinity of the second electrode 4A and the fifth electrode 20 and the region in the vicinity of the third electrode 4B and the sixth electrode 21. In the construction shown in FIG. 2, the second electrode 4A, the fifth electrode 20, the third electrode 4B and the sixth electrode 21 are formed in the corner portions of the pixel so as to make it possible to increase the substantial aperture rate during the stage of the discolored display. The first AC power source 22 and the second AC power source 23 are arranged in the electrophoretic display device shown in FIG. 2. However, the second embodiment of the present invention is not limited to the particular construction. For example, it is possible to arrange a single AC power source serving to apply an AC voltage between the second electrode 4A and the fifth electrode 20 and between the third electrode 4B and the sixth electrode 21.

Also, the first electrode 3 is connected to a DC power source 8. If a DC voltage is applied from the DC power source 8 to the first electrode 3, an electrophoretic force is generated between the first electrode 3 and any of the second electrode 4A, the third electrode 4B, the fifth electrode 20 and the sixth electrode 21. Where the electrophoretic force is rendered greater than the dielectrophoretic force noted above, the colored and charged fine particles 10 are allowed to migrate toward the first electrode 3. It follows that, according to the display device shown in FIG. 2, it is possible to permit the colored and charged fine particles 10 to migrate with threshold characteristics given thereto so as to perform the display as in the first embodiment described previously. In addition, since it is possible to increase the aperture rate in the stage of the discolored display, it is possible to achieve the display of a high contrast.

Third Embodiment

An electrophoretic display device according to a third embodiment of the present invention will now be described with reference to FIG. 3. In the electrophoretic display device shown in FIG. 3, the dielectrophoretic force is generated in a region larger than that in the display device shown in FIG. 1. The following description covers only those portions of the electrophoretic display device (FIG. 3) which differ in construction from the display device shown in FIG. 1, and the similar portions or the members of the electrophoretic display devices are denoted by the same reference numerals throughout FIGS. 1 and 3 so as to avoid the overlapping description.

Figure 3:
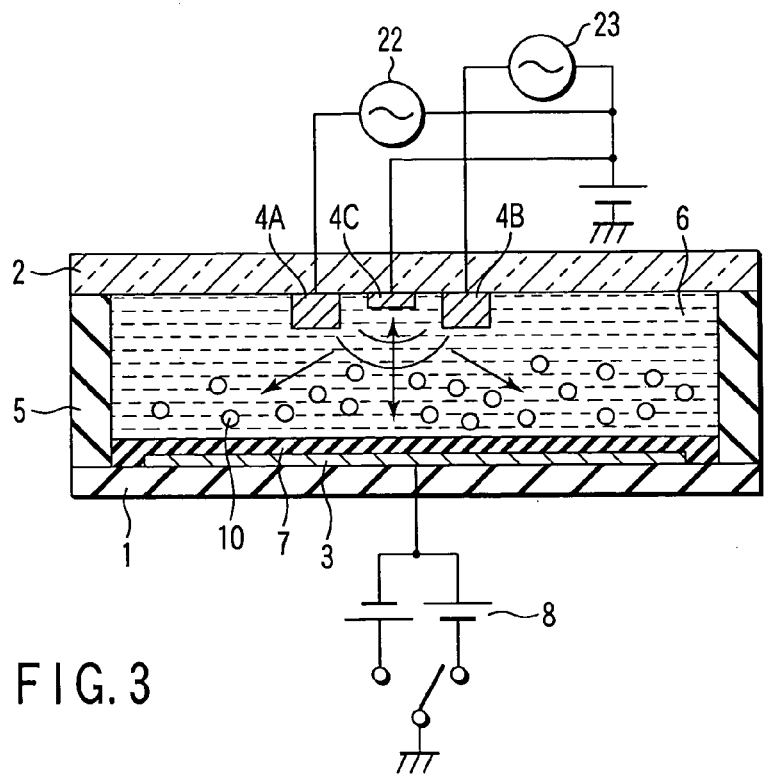
FIG. 3 is a cross sectional view schematically showing the construction of a single pixel included in an electrophoretic display device for a third embodiment of the present invention.

FIG. 3 is a cross sectional view schematically showing the construction of a single pixel included in the electrophoretic display device according to the third embodiment of the present invention.

The electrophoretic display device shown in FIG. 3 differs from the display device shown in FIG. 1 in that, in the electrophoretic display device shown in FIG. 3, a fourth electrode 4C is formed intermediate between the second electrode 4A and the third electrode 4B. An AC voltage supplied from the first AC power source 22 is applied between the second electrode 4A and the fourth electrode 4C, and an AC voltage supplied from the second AC power source 23 is applied between the third electrode 4B and the fourth electrode 4C, thereby inducing a dielectrophoretic force. In this case, the fourth electrode 4C is maintained at a constant voltage. Also, it is possible to apply an AC voltage between the second electrode 4A and the third electrode 4B such that the second and third electrodes 4A and 4B bear the opposite phases, i.e., a positive phase and a negative phase, with respect to the potential of the fourth electrode 4C. It is also possible to apply a prescribed bias to the potential of the fourth electrode 4C so as to apply an AC voltage between the second electrode 4A and the third electrode 4B such that the second and third electrodes 4A and 4B bear the opposite phases, i.e., a positive phase and a negative phase. Further, it is possible to mount a single AC power source serving to apply an AC voltage between the second electrode 4A and the fourth electrode 4C and between the third electrode 4B and the fourth electrode 4C.

In addition, a DC voltage is applied between the first electrode 3 and the fourth electrode 4C by the DC power source 8.

Because of the particular construction described above, an AC electric field is generated between the second electrode 4A and the fourth electrode 4C and between the third electrode 4B and the fourth electrode 4C in the electrophoretic display device shown in FIG. 3. As a result, formed is a broader region in which the electric field required for the dielectrophoresis is changed. Also, since the DC voltage is applied between the fourth electrode 4C and the first electrode 3, it is possible to permit the colored and charged fine particles 10 to be attracted sufficiently toward the substrate. As a result, it is possible to apply the equal dielectrophoretic force to a larger number of the fine particles. Such being the situation, it is possible to stabilize more efficiently the threshold value in the stage of causing the colored and charged fine particles 10 to allowed migrating by the electrophoretic force from the region in the vicinity of the second electrode 4A, the third electrode 4B and the fourth electrode 4C toward the first electrode 3.

Figure 4A:
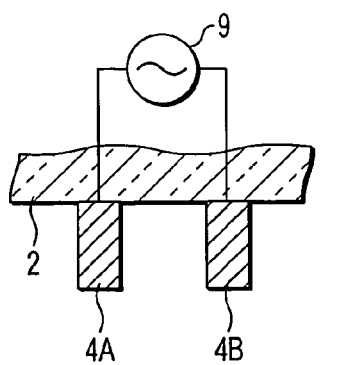
FIGS. 4A, 4B and 4C are partial cross sectional views schematically showing the constructions of second and third electrodes.
Figure 4B:
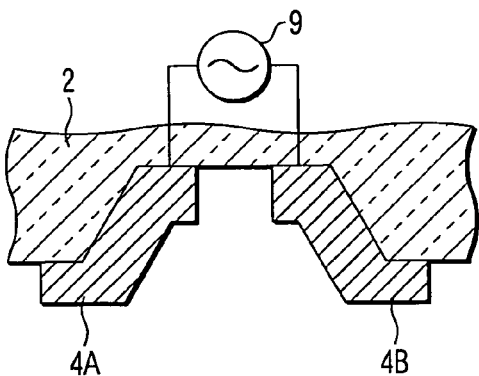
Figure 4C:
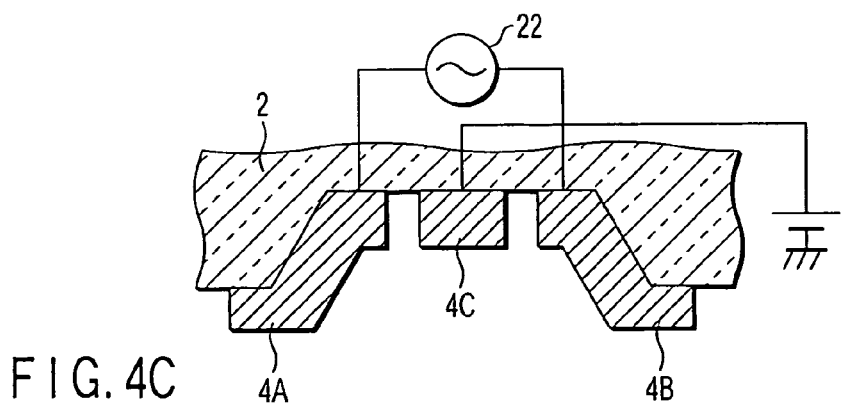

Incidentally, when the colored and charged fine particles 10 are collected by the dielectrophoretic force in the vicinity of the second electrode 4A, the third electrode 4B and the fourth electrode 4C, the colored and charged fine particles 10 are collected at a high density. Such being the situation, it is desirable for the electrodes to be shaped or constructed in a manner to facilitate the collection of the colored and charged fine particles 10. FIGS. 4A, 4B and 4C exemplify the preferred constructions of the second electrode 4A, the third electrode 4B and the fourth electrode 4C.

FIG. 4A exemplifies the construction covering the case where the second electrode 4A and the third electrode 4B are formed thick. In the construction exemplified in FIG. 4A, those portions of the electrodes 4A and 4B, which are positioned to face each other directly, have large areas. Also, the distance between these electrodes 4A and 4B is large. It follows that a larger number of colored and charged fine particles 10 can be collected in the region in the vicinity of these electrodes 4A and 4B. Also, in the construction exemplified in FIG. 4B, a concave groove is formed in the substrate 2. In this case, the effect of generating an electric field over a wide area so as to collect the colored and charged fine particles 10 can be expected even if the second electrode 4A and the third electrode 4B are formed to cover the inclined surfaces of the groove portion. Further, in the construction exemplified in FIG. 4C, a concave groove is formed in the second substrate 2, and the second electrode 4A and the third electrode 4B are formed to cover the inclined surfaces of the groove portion, as in the construction shown in FIG. 4B. In addition, the fourth electrode 4C is formed within the groove portion. If an AC voltage is applied between the second electrode 4A and the fourth electrode 4C and between the third electrode 4B and the fourth electrode 4C so as to set constant the voltage of the fourth electrode 4C, an electric field is generated over a large area so as to permit the colored and charged fine particles 10 to be collected efficiently in the groove. Further, in the construction exemplified in FIG. 4C, the electric field generated between the second electrode 4A and the third electrode 4C can also be utilized for the generation of the dielectrophoretic force by making the AC voltages applied to the second electrode 4A and the third electrode 4B opposite to each other in phase.

Fourth Embodiment

An electrophoretic display device according to a fourth embodiment of the present invention will now be described with reference to FIG. 5. In the electrophoretic display device shown in FIG. 5, the second electrode 4A and the third electrode 4B for generating a dielectrophoretic force are arranged close to the first electrode 3, and the dielectrophoretic force is generated by the electric field generated between the first electrode 3 and the second electrode 4B and between the first electrode 3 and the third electrode 4B. The following description covers only those portions of the electrophoretic display device (FIG. 5) which differ in construction from the display device shown in FIG. 1, and the similar portions or the members of the electrophoretic display devices are denoted by the same reference numerals throughout FIGS. 1 and 5 so as to avoid the overlapping description.

Figure 5:
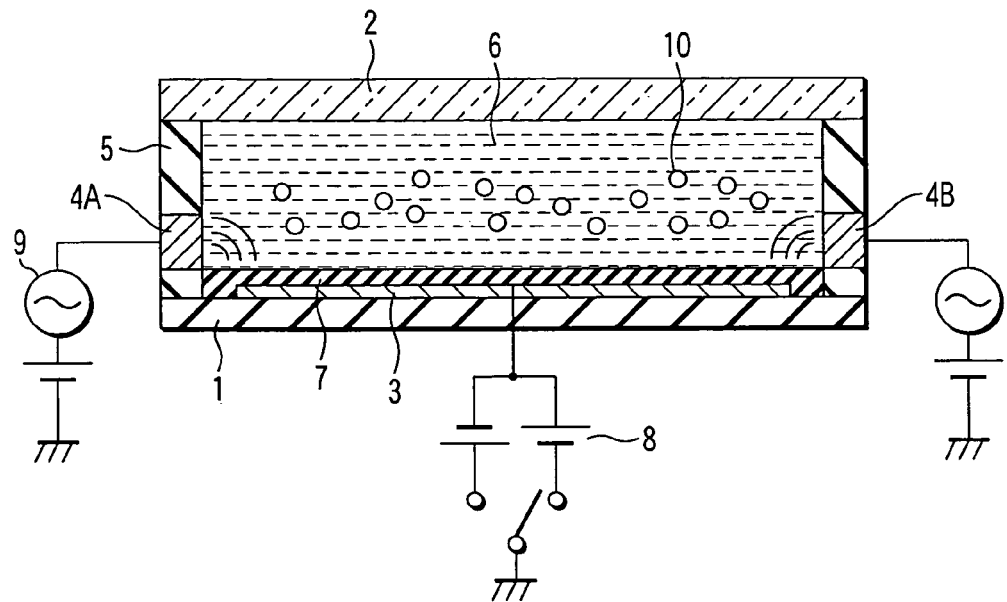
FIG. 5 is a cross sectional view schematically showing the construction of a single pixel included in an electrophoretic display device for a fourth embodiment of the present invention.

FIG. 5 is a cross sectional view schematically showing the construction of a single pixel included in the electrophoretic display device according to the fourth embodiment of the present invention.

In the electrophoretic display device shown in FIG. 5, the second electrode 4A and the third electrode 4B are formed in contact with the partition walls 5 in the both edge portions of the pixel. It should be noted, however, that it suffices for the second electrode 4A and the third electrode 4B to be arranged in the vicinity of the first electrode 3, and it is not absolutely necessary for these electrodes 4A and 4B to be in contact with the partition walls 5. It is desirable for each of the distance between the first electrode 3 and the second electrode 4A and the distance between the first electrode 3 and the third electrode 4B to be about 5 μm to about 20 μm in order to prevent the aperture rate from being lowered. It is also possible for the second electrode 4A and the third electrode 4B to be arranged between the partition wall 5 and the first electrode 3. In the wiring shown in FIG. 5, the second electrode 4A and the third electrode 4B are connected to different power sources. However, these electrodes 4A and 4B are actually connected to an AC power source 9 common to all the pixels such that a very low AC voltage is applied to these electrodes 4A and 4B. On the other hand, a DC voltage is applied to the first electrode 3 in accordance with the image signal for each pixel. Where the potential of the first electrode 3 is close to the AC voltage applied to each of the second electrode 4A and the third electrode 4B, the electric field generated between the first electrode 3 and the second electrode 4A and between the first electrode 3 and the third electrode 4B is rendered predominant, with the result that the colored and charged fine particles 10 are collected by the dielectrophoretic force in the regions between the first electrode 3 and the second electrode 4A and between the first electrode 3 and the third electrode 4B. On the other hand, where the potential difference of the first electrode 3 is large, compared with the AC voltage applied to the second electrode 4A and the third electrode 4B, the electrophoretic force between the first electrode 3 and the second electrode 4A and between the first electrode 3 and the third electrode 4B is rendered predominant, with the result that the colored and charged fine particles 10 are allowed to migrate toward the first electrode 3 or toward the second and third electrodes 4A, 4B in accordance with the polarity of the charge of the colored and charged fine particles 10. It follows that the electrophoretic force is utilized for permitting the colored and charged fine particles 10 to be allowed to migrate toward the first electrode 3 or toward the second and third electrodes 4A, 4B, and the dielectrophoretic force is utilized for allowing the colored and charged fine particles 10 to be kept attracted toward the second electrode 4A and the third electrode 4B. It is also possible to utilize the electrophoretic force for allowing the colored and charged fine particles 10 to be kept attracted toward the first electrode 3.

As in the electrophoretic display device shown in FIG. 1, the threshold characteristics can also be imparted to the migration of the colored and charged fine particles 10 by the electrophoretic force and the dielectrophoretic force in the electrophoretic display device shown in FIG. 5. Also, since the second electrode 4A and the third electrode 4B are mounted in the vicinity of the first substrate 1 in the electrophoretic display device shown in FIG. 5, the electrophoretic display device can be manufactured easily, and the aperture rate can be increased.

Fifth Embodiment

An electrophoretic display device according to a fifth embodiment of the present invention will now be described. In the electrophoretic display device according to the fifth embodiment of the present invention, used is the insulating liquid medium 6 having colored and charged fine particles 10 dispersed therein, the colored and charged fine particles 10 being colored in three colors of cyan, magenta and yellow, so as to realize a color display. The following description covers only those portions of the electrophoretic display device according to the fifth embodiment of the present invention, which differ in construction from the display device shown in FIG. 1 so as to avoid the overlapping description.

In the electrophoretic display device according to the fifth embodiment of the present invention, it is possible to use various pixel structures described previously in conjunction with the first to fourth embodiments. In this case, the display device for the fifth embodiment will now be described with reference to FIGS. 1 and 6 on the basis that the display device for the fifth embodiment has a pixel structure shown in FIG. 1, which was described previously in conjunction with the first embodiment of the present invention.

The description given previously in respect of the display device shown in FIG. 1 covered the case where two colors were displayed, and did not cover the case where three colors were displayed. In the display device according to the fifth embodiment of the present invention, however, the colored and charged fine particles 10 colored in three colors of cyan, magenta and yellow are dispersed in the insulating liquid medium 6 loaded in the display device so as to make it possible to display eight colors in total by utilizing the three kinds of the colored and charged fine particles 10. The following description is on the basis that the three kinds of the colored and charged fine particles 10 are charged in the same polarity.

Figure 6:
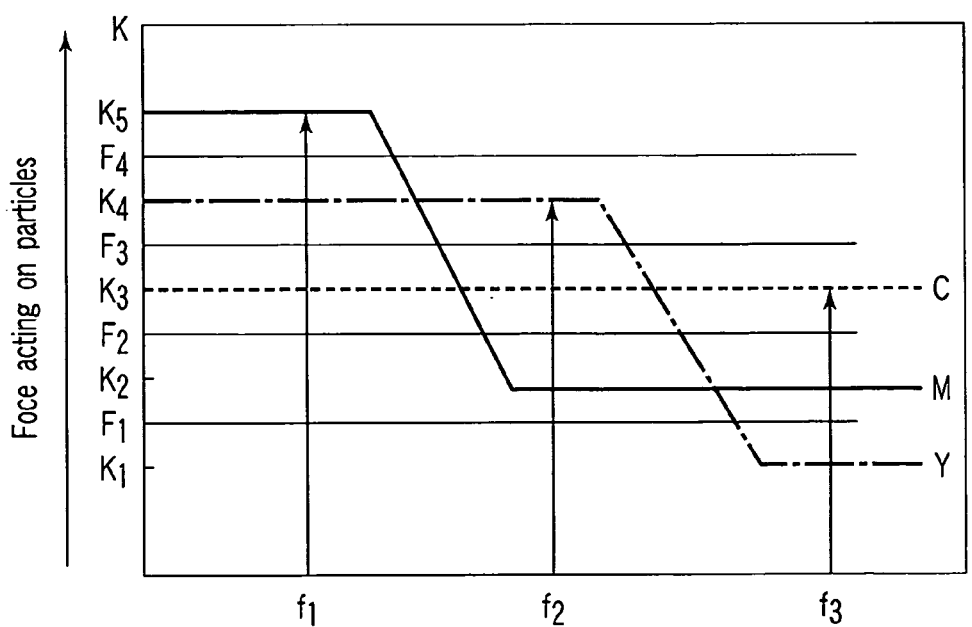
FIG. 6 is a graph exemplifying the relationship between the frequency of the AC electric field and the value K in the charged fine particles colored in three colors of cyan, magenta and yellow.

FIG. 6 is a graph showing the characteristics of each of the colored fine particles. In the graph of FIG. 6, the value K with formula (1) used as a parameter is plotted on the ordinate, and the frequency of the AC electric field is plotted on the abscissa.

A dotted curve C shown in FIG. 6 denotes the characteristics of the cyan fine particles, a solid line M denotes the characteristics of the magenta fine particles, and a chain line Y denotes the characteristics of the yellow fine particles. As described previously, the value K plotted on the ordinate (formula (1)) is proportional to the magnitude of the dielectrophoretic force. Also, as apparent from FIG. 6, the dielectrophoretic force is dependent on the frequency of the AC electric field generated between the second electrode 4A and the third electrode 4B. In other words, the value K is dependent on the frequencies $f_1$, $f_2$, $f_3$ and it is possible to take any of the values $K_1$ to $K_5$ in accordance with the frequencies $f_1$, $f_2$ and $f_3$. For example, under the first frequency $f_1$, the dielectrophoretic force imparted to the colored and charged fine particles 10 that are colored cyan C is most diminished among the three kinds of the colored and charged fine particles ($K_3 < K_4 < K_5$). Also, under the second frequency $f_2$, the dielectrophoretic force imparted to the colored fine particles 10 that are colored magenta M is most diminished among the three kinds of the colored fine particles ($K_2 < K_3 < K_4$). Further, under the third frequency $f_3$, the dielectrophoretic force imparted to the colored and charged fine particles 10 that are colored yellow Y is most diminished among the three kinds of the colored fine particles ($K_1 < K_2 < K_3$).

The values $K_1$ to $K_5$ shown in FIG. 6 can be represented by formulas (2) to (6) given below. In this case, the values K have the relationship of $K_5 > K_4 > K_3 > K_2 > K_1$. Also, the charged fine particles that are colored cyan have the value $K_3$ under any of frequencies $f_1$, $f_2$ and $f_3$. The charged fine particles that are colored yellow have the value $K_4$ under any of frequencies $f_1$ and $f_2$. Further, charged fine particles that are colored magenta have the value $K_5$ under frequency $f_1$ and have the value $K_2$ under the frequency of any of $f_2$ and $f_3$.

$$K_5 = Re[(\in_{21} - \in_{l/1})/(\in_{21} + 2\in_{l/1})] \quad (2)$$

$$K_4 = Re[(\in_{22} - \in_{l/1})/(\in_{22} + 2\in_{l/1})] \quad (3)$$

$$K_3 = Re[(\in_{23} - \in_{l/1})/(\in_2 + 23\in_{l/1})] \quad (4)$$

$$K_2 = Re[(\in_{24} - \in_{l/1})/(\in_{24} + 2\in_{l/2})] \quad (5)$$

$$K_1 = Re[(\in_{25} - \in_{l/3})/(\in_{25} + 2\in_{l/3})] \quad (6)$$

where $\in_{l/1}$, $\in_{l/2}$, and $\in_{l/3}$, denote the complex permittivity of the insulating liquid medium under the frequencies $f_1$, $f_2$ and $f_3$, respectively, $\in_{21}$ denotes the complex permittivity of the magenta fine particles under the frequency $f_1$, $\in_{22}$ denotes the complex permittivity of the yellow fine particles under the frequency of $f_1$, $\in_{23}$ denotes the complex permittivity of the cyan fine particles under the frequency of $f_1$, $\in_{24}$ denotes the complex permittivity of the magenta fine particles under the frequencies of $f_2$ and $f_3$, and $\in_{25}$ denotes the complex permittivity of the yellow fine particles under the frequency $f_3$.

The electrophoretic forces $F_1$ to $F_4$ ($F_4>F_3>F_2>F_1$) acting between the first electrode 3 and any of the second and third electrodes 4A, 4B are shown as threshold values in FIG. 6. The voltage source 8 is capable of selectively generating the first to fourth voltages $V_1$ to $V_4$ corresponding to the electrophoretic forces $F_1$, $F_2$, $F_3$ and $F_4$, respectively, and upon application of the first to fourth voltages $V_1$ to $V_4$ between the first electrode 3 and any of the second and third electrodes 4A, 4B, the electrophoretic forces $F_1$, $F_2$, $F_3$ and $F_4$ are imparted, respectively, to the colored and charged fine particles 10. The electrophoretic forces $F_1$ to $F_4$ are set at the threshold values and imparted selectively to the colored and charged fine particles 10, with the result that the charged fine particles 10 that are colored cyan, magenta and yellow are selectively allowed to migrate as shown in Table 1 below. It follows that the electrophoretic display device is capable of displaying eight colors including red, blue, green, white and black in addition to cyan, magenta and yellow.

The display method for displaying the desired colors and the mixed colors prepared by mixing a desired amount of the desired colors will now be described with reference to FIGS. 1 and 6, and Table 1 below, covering the case where the charged fine particles 10 that are colored cyan, magenta and yellow and exhibit the characteristics as shown in FIG. 6 are dispersed in the insulating liquid medium 6 and loaded in the display device shown in FIG. 1.

TABLE 1

| Electrophoretic forces | $f_1$ | $f_2$ | $F_3$ |
|---|---|---|---|
| ~0 | W | W | W |
| $F_1$ | W | W | Y |
| $F_2$ | W | M | R = M + Y |
| $F_3$ | C | B = C + M | BK |
| $F_4$ | G = C + Y | BK | BK |

Table 1 shows the relationship between the frequencies $f_1$ to $f_3$ and the electrophoretic forces $F_1$ to $F_4$ corresponding to the threshold values for the migration of the cyan, magenta and yellow fine particles 10. In Table 1, W denotes the white display, M denotes the magenta display, C denotes the cyan display, R denotes the red display, B denotes the blue display, G denotes the green display, and BK denotes the black display. Also, the expression "R=M+Y" shown in Table 1 denotes that the magenta and yellow fine particles 10 are mixed so as to display the red color. On the other hand, the expression "B=C+M" denotes that the cyan and magenta fine particles 10 are mixed so as to display the blue color. Further, the expression "G=C+Y" denotes that the cyan and yellow fine particles 10 are mixed so as to display the green color. On the other hand, the black BK denotes that all of the cyan, magenta and yellow fine particles are allowed to migrate toward the first electrode 3 by the electrophoretic force, with the result that the black color is observed as a mixed color of the cyan, magenta and yellow fine particles 10. Likewise, the white W denotes that all the fine particles 10 are collected on the second and third electrodes 4A, 4B and shielded by the second and third electrodes 4A, 4B, with the result that the color of the fine particles 10 is not observed. It follows that observed is the white color that is the background color, i.e., the color of the first electrode 3, the color of the insulating layer 7, or the color of the first substrate 1.

In the first step, the potential of the first electrode 3 is set to permit the dielectrophoretic force to be rendered predominant, with the result that all the colored and charged fine particles 10 are collected in the vicinity of the second electrode 4A and the third electrode 4B. For example, the potential of the first electrode 3 is set to repel the colored and charged fine particles 10 or to attract the colored and charged fine particles 10 with very weak attracting force. To be more specific, if the potential of the first electrode 3 is set not to impart the electrophoretic force to the colored and charged fine particles 10, and an AC voltage having a frequency of any of the frequencies $f_1$ to $f_4$ is applied between the second electrode 4A and the third electrode 4B, the dielectrophoretic force (K>0) predominantly acts on the colored and charged fine particles 10, compared with the electrophoretic force F (≈0). As a result, the colored and charged fine particles 10 are restricted by the AC electric field generated between the second electrode 4A and the third electrode 4B. Under the state that the colored and charged fine particles 10 are restricted in the region below the second electrode 4A and the third electrode 4B, the colored and charged fine particles 10 are shielded from the outside by the second electrode 4A and the third electrode 4B. It follows that the color of the colored and charged fine particles 10 is not observed, and the while color W, which is the background color, is observed.

Similarly, even if the voltage value between the first electrode 3 and any of the second and third electrodes 4A, 4B is set to impart the electrophoretic force $F_1$ to the colored and charged fine particles 10, the dielectrophoretic force (K>$K_1$) predominantly acts on the colored and charged fine particles 10, compared with the electrophoretic force F, even in the case where an AC voltage having a frequency of any of the frequencies $f_1$ and $f_2$ is applied between the second electrode 4A and the third electrode 4B. It follows that the colored and charged fine particles 10 are restricted by the AC electric field between the second electrode 4A and the third electrode 4B, with the result that the color of the colored and charged fine particles 10 is not observed, and the white color W, which is the background color, is observed.

Similarly, even if the voltage value between the first electrode 3 and any of the second and third electrodes 4A, 4B is set to impart the electrophoretic force $F_2$ to the colored and charged fine particles 10, the dielectrophoretic force predominantly acts on the colored and charged fine particles 10, compared with the electrophoretic force $F_2$. It follows that the colored and charged fine particles 10 are restricted by the AC electric field between the second electrode 4A and the third electrode 4B, with the result that the color of the colored and charged fine particles 10 is not observed, and the white color W, which is the background color, is observed.

When the black color is displayed, the electrophoretic force is allowed to act predominantly on the colored and charged fine particles 10, compared with the dielectrophoretic force, so as to permit the colored and charged fine particles 10 to migrate from the second electrode 4A and the third electrode 4B toward the first electrode 3. As a result, the first electrode 3 is covered with the colored and charged fine particles 10 and, thus, the black color is observed as a mixed color of the colored and charged fine particles 10. For example, the voltage value between the first electrode 3 and any of the second and third electrodes 4A, 4B is set to impart the electrophoretic force $F_3$ or $F_4$ to the colored and charged fine particles 10, and the frequency of the AC voltage applied between the second electrode 4A and the third electrode 4B is set at the frequency $f_3$. Alternatively, it is possible for the voltage value between the first electrode 3 and any of the second and third electrodes 4A, 4B to be set to impart the electrophoretic force F4 to the colored and charged fine particles 10, and for the frequency of the AC voltage applied between the second electrode 4A and the third electrode 4B to be set at the frequency $f_2$. In this case, the electrophoretic force is rendered greater than the dielectrophoretic force serving to restrict the colored and charged fine particles 10, and the electrophoretic force serves to permit all the colored and charged fine particles 10 to migrate from the second electrode 4A and the third electrode 4B toward the first electrode 3. As a result, a black color is displayed as a mixed color.

For the display of the cyan color, an AC voltage having the first frequency f1 is applied between the second electrode 4A and the third electrode 4B under the state that the colored and charged fine particles 10 are restricted by the dielectrophoretic force in the region between the second electrode 4A and the third electrode 4B, and a potential is imparted to the first electrode 3 so as to generate the electrophoretic force $F_3$. The potential imparted to the first electrode 3 has a polarity such that the colored and charged fine particles 10 are attracted toward the first electrode 3 by the electrophoresis. To be more specific, the frequency of the AC voltage applied between the second electrode 4A and the third electrode 4B is set at the first frequency $f_1$, and the voltage value between the first electrode 3 and any of the second and third electrodes 4A, 4B is set to impart the electrophoretic force $F_3$ to the colored and charged fine particles 10. Under the first frequency $f_1$, the electrophoretic force $F_3$ is smaller than the dielectrophoretic force that is imparted to the colored and charged fine particles 10 that are colored yellow and magenta and larger than the dielectrophoretic force imparted to the colored and charged fine particles 10 that are colored cyan. As a result, only the colored and charged fine particles 10 that are colored cyan are allowed to migrate by the electrophoretic force $F_3$ toward the first electrode 3. It follows that the colored and charged fine particles 10 that are colored cyan are expanded over the first electrode 3 and, thus, the cyan color alone is observed.

For the display of the green color, the voltage value between the first electrode 3 and any of the second and third electrodes 4A, 4B is set impart the electrophoretic force $F_4$ to the colored and charged fine particles 10 under the state that an AC voltage having the first frequency $f_1$ is applied between the second electrode 4A and the third electrode 4B. Under the first frequency $f_1$, the colored and charged fine particles 10 that are colored yellow and have a weak dielectrophoretic force, which is slightly stronger than that of the colored and charged fine particles 10 that are colored cyan, are allowed to migrate together with the colored and charged fine particles 10 that are colored cyan. To be more specific, under the first frequency $f_1$, the electrophoretic force $F_4$ is smaller than the dielectrophoretic force imparted to the colored and charged fine particles 10 that are colored magenta and larger than the dielectrophoretic force imparted to the colored and charged fine particles 10 that are colored yellow. As a result, the colored and charged fine particles 10 that are colored cyan and yellow are selectively allowed to migrate by the electrophoretic force $F_4$ toward the first electrode 3. It follows that the colored and charged fine particles 10 that are colored cyan and yellow are expanded over the first electrode 3 and, thus, the green color, which is a mixed color of cyan and yellow, is observed.

When the magenta color is displayed, an AC voltage having the second frequency $f_2$ is applied between the second electrode 4A and the third electrode 4B after all the colored and charged fine particles 10 are collected in the vicinity of the second electrode 4A and the third electrode 4B. Also, the voltage value between the first electrode 3 and any of the second and third electrode 4A, 4B is set to impart the electrophoretic force $F_2$ to the colored and charged fine particles 10. Under the second frequency $f_2$, the electrophoretic force $F_2$ is rendered smaller than the dielectrophoretic force imparted to the colored and charged fine particles 10 that are colored cyan and yellow and larger than the dielectrophoretic force imparted to the colored and charged fine particles 10 that are colored magenta. It follows that only the colored and charged fine particles 10 that are colored magenta are allowed to migrate toward the first electrode 3 so as to achieve the display of the magenta color.

When the blue color is displayed, the voltage value between the first electrode 3 and any of the second and third electrodes 4A, 4B is set to impart the electrophoretic force $F_3$ to the colored and charged fine particles 10 under the state that an AC voltage having the second frequency $f_2$ is applied between the second electrode 4A and the third electrode 4B. Under the second frequency $f_2$, the electrophoretic force $F_3$ is rendered smaller than the dielectrophoretic force imparted to the colored and charged fine particles 10 that are colored yellow and larger than the dielectrophoretic force imparted to the colored and charged fine particles 10 that are colored cyan and magenta. It follows that the colored and charged fine particles 10 that are colored cyan and magenta are selectively allowed to migrate toward the first electrode 3 and expanded over the first electrode 3 so as to achieve the display of the blue color, which is a mixed color of cyan and magenta.

When the yellow color is displayed, an AC voltage having the third frequency $f_3$ is applied between the second electrode 4A and the third electrode 4B after all the colored and charged fine particles 10 are collected in the vicinity of the second electrode 4A and the third electrode 4B. Also, the voltage value between the first electrode 3 and any of the second and third electrode 4A, 4B is set to impart the electrophoretic force $F_1$ to the colored and charged fine particles 10. Under the third frequency $f_3$, the electrophoretic force $F_1$ is rendered smaller than the dielectrophoretic force imparted to the colored and charged fine particles 10 that are colored cyan and magenta and larger than the dielectrophoretic force imparted to the colored and charged fine particles 10 that are colored yellow. It follows that only the colored and charged fine particles 10 that are colored yellow are allowed to migrate toward the first electrode 3 so as to achieve the display of the yellow color.

Further, when the red color is displayed, the voltage value between the first electrode 3 and any of the second and third electrodes 4A, 4B is set to impart the electrophoretic force $F_4$ to the colored and charged fine particles 10 under the state that an AC voltage having the third frequency $f_3$ is applied between the second electrode 4A and the third electrode 4B. Under the third frequency $f_3$, the electrophoretic force $F_2$ is rendered smaller than the dielectrophoretic force imparted to the colored and charged fine particles 10 that are colored cyan and magenta and larger than the dielectrophoretic force imparted to the colored and charged fine particles 10 that are colored yellow. It follows that the colored and charged fine particles 10 that are colored yellow and magenta are selectively allowed to migrate toward the first electrode 3 and expanded over the first electrode 3 so as to achieve the display of the red color, which is a mixed color of yellow and magenta.

It should be noted that, if the electrophoretic force is set at an intermediate level corresponding to the threshold value noted above, the number of the colored and charged fine particles 10 that are to be allowed to migrate is decreased or increased so as to permit display of the intermediate color.

When the information on the pixel is rewritten, voltage of a reversed bias is once applied to the first electrode 3 so as to cause all of the colored and charged fine particles 10 that are colored cyan, magenta and yellow to be collected by the electrophoretic force in the vicinity of the second electrode 4A and the third electrode 4B. In the display noted above, it suffices for the voltage applied to the second electrode 4A and the third electrode 4B to generate the dielectrophoretic force effective for preventing the colored and charged fine particles 10 remaining in the vicinity of the second electrode 4A and the third electrode 4B from being diffused. Also, it is possible to lower the amplitude of the AC voltage. This is also the case with the frequency. In view of the power consumption, it is desirable to lower the amplitude and the frequency of the AC voltage in the case where the screen is not rewritten. Further, when it comes to the particles having the smallest value K of formula (1) under each frequency, it is possible for the symbol of the value K to be negative. Concerning the other particles, it is desirable for the symbol of the value K to be positive.

In the fifth embodiment of the present invention, the display can be performed by allowing the colored and charged fine particles 10 to migrate while imparting threshold characteristics to the colored and charged fine particles 10 as in the first embodiment of the present invention described previously. In addition, it is possible to perform the color display by controlling the frequency of the AC voltage and the potential of the DC voltage so as to allow the colored and charged fine particles 10 to migrate while imparting different threshold characteristics to a plurality of different kinds of the colored and charged fine particles 10.

In summarizing of the above described embodiment, following relations are established.

If the fine particles are charged in same polarity and are colored to first and second colors, the alternative power source 9 can selectively generate AC voltages having frequencies $f_1$, $f_2$ and apply the AC voltages having first and second frequencies $f_1$, $f_2$ to the second and third electrodes 4A, 4B, the first and second colors fine particles have values $K_{a1}$ and $K_{a2}$, the value $K_{a1}$ being larger than $K_{a2}$ ($K_{a1}>K_{a2}$) The values $K_{a1}$ and $K_{a2}$ are determined by formulas (7) and (8) given below under the first frequency $f_1$. The first and second colors fine particles also have values $K_{b1}$ and $K_{b2}$, the value $K_{b1}$ being smaller than $K_{b2}$. The values $K_{b1}$ and $K_{b2}$ are determined by formulas (9) and (10) given below under the second frequency $f_2$.

$$K_{a1}=Re[(\in_{21}-\in_{11})/(\in_{21}+2\in_{11})] \quad (7)$$

$$K_{a2}=Re[(\in_{31}-\in_{11})/(\in_{31}+2\in_{11})] \quad (8)$$

$$K_{b1}=Re[(\in_{22}-\in_{12})/(\in_{22}+2\in_{12})] \quad (9)$$

$$K_{b2}=Re[(\in_{32}-\in_{12})/(\in_{32}+2\in_{12})] \quad (10)$$

where $\in_{11}$ and $\in_{12}$ denote the complex permittivity of the insulating liquid medium under the first and second frequencies $f_1$ and $f_2$, respectively, $\in_{21}$ and $\in_{31}$ denote the complex permittivity of the charged particles of the first color and the second color under the first frequency, respectively, $\in_{22}$ and $\in_{32}$ denote the complex permittivity of the charged particles of the first color and the second color under the second frequency, respectively, Re denotes the real number portion, and the values $K_{a1}$, $K_{a2}$, $K_{b1}$, and $K_{b2}$ are real numbers.

If the fine particles are charged in same polarity and are colored to first, second and third colors, the alternative power source 9 can selectively generate AC voltages having first, second and third frequencies $f_1$, $f_2$, $f_3$ and apply the AC voltages having frequencies $f_1$, $f_2$ to the second and third electrodes 4A, 4B, the first and second colors fine particles have values $K_1(f_1)$, $K_2(f_1)$ and $K_3(f_1)$ under the first frequency $f_1$, respectively, which have the relationship of $K_1(f_1)>K_2(f_1)>K_3(f_1)$. The first, second and third fine particles also have values $K_1(f_2)$, $K_2(f_2)$ and $K_3(f_2)$ under the second frequency $f_2$, respectively, which have the relationship of $K_2(f_2)>K_3(f_2)>K_1(f_2)$. The first, second and third fine particles yet have values $K_1(f_3)$, $K_2(f_3)$ and $K_3(f_3)$ under the third frequency $f_3$, respectively, which have the relationship of $K_3(f_3)>K_1(f_3)>K_2(f_3)$. The values of $K_1(f_1)$, $K_2(f_1)$, $K_3(f_1)$, $K_2(f_2)$, $K_3(f_2)$, $K_1(f_2)$, $K_3(f_3)$, $K_1(f_3)$, and $K_2(f_3)$ are defined by the following equations:

$$K_i(f_1)=Re[(\in_i(f_1)-\in_{lq}(f_1))/(\in_i(f_1)+2\in_{lq}(f_1))] \quad (11)$$

$$K_i(f_2)=Re[(\in_i(f_2)-\in_{lq}(f_2))/(\in_i(f_2)+2\in_{lq}(f_2))] \quad (12)$$

$$K_i(f_3)=Re[(\in_i(f_3)-\in_{lq}(f_3))/(\in_i(f_3)+2\in_{lq}(f_3))] \quad (13)$$

(i=1, 2, 3)

where $\in_{lq}(f_1)$, $\in_{lq}(f_2)$, and $\in_{lq}(f_3)$, denote the complex permittivity of the insulating liquid medium under the frequencies $f_1$, $f_2$ and $f_3$, respectively, $\in_i(f_1)$, $\in_i(f_2)$, and $\in_i(f_3)$ $\in_{21}$ denotes the complex permittivity of the first, second, and third fine particles under the frequencies $f_1$, $f_2$, and $f_3$.

In each of the embodiments described above, it is possible for each of the first substrate and the second substrate to be formed of a transparent material such as glass or quartz as well as a transparent polymer film such as an acrylic resin film, a PET (polyethylene terephthalate) film, a PES (polyether sulfone) film, or a polycarbonate (PC) film. Also, where the observing plane is formed on the side of the second substrate, the first substrate need not be transparent and, thus, it is possible for the first substrate to be formed of a metal film such as a stainless steel thin film or a substrate formed of a polyimide film. Also, each of the first electrode, the second electrode and the third electrode can be formed by, for example, a sputtering method, a vapor deposition method or a coating method by using a transparent electrode material such as ITO (oxidized indium tin alloy) or IZO (oxidized indium zinc alloy), fine particles thereof, or a transparent organic conductive material such as PEDOT (manufactured by Bayer Inc.), as well as a light reflective member such as aluminum, silver or an alloy thereof.

Further, it is desirable to use an insulating liquid medium, which is colorless and transparent and has a low dielectric constant. Also, in order to improve the migrating velocity of the colored and charged fine particles within the insulating liquid medium, it is desirable for the insulating liquid medium to have a low viscosity. For example, it is desirable to use an iso-paraffin, a silicone oil, toluene or xylene as the insulating liquid medium. It is desirable for the colored and charged fine particles to be formed of fine particles satisfactory in the charging characteristics and dispersion characteristics. For example, it is possible to use polyethylene fine particles or polyurethane fine particles as the colored and charged fine particles. It is possible for the fine particles not to be colored so as to provide charged fine particles. It is also possible for the charged fine particles to be colored so as to provide colored and charged fine particles. The colored and charged fine particles used for the color display can be prepared by mixing a pigment with the charged fine particles or by encapsulating the colored and charged fine particles for preparing microcapsules of a composite form. In the case of displaying the black color, it is possible to use a carbon black. Also, in the aspect of controlling the complex permittivity, it is effective to add a material having a high conductivity such as a finely pulverized metal, a finely pulverized semiconductor, or a conductive resin to the colored and charged fine particles so as to control the conductivity of the colored and charged fine particles.

In addition to the materials described above, it is possible to use various materials and the manufacturing methods within the technical scope of the present invention.

Specific Examples of the present invention will now be described more in detail with reference to the accompanying drawing.

EXAMPLE 1

Example 1 according to the first embodiment of the present invention will now be described. As shown in FIG. 1, used was an active matrix substrate 1 (first substrate) having a wiring and a thin film transistor (not shown) formed on a glass substrate. In the first step, an ITO film was formed as a first electrode 3 such that the first electrode 3 was electrically connected to the source electrode of the thin film transistor included in each pixel, followed by patterning the ITO film in the shape of the pixel electrode.

In the next step, a partition wall 5 was formed by using a photosensitive polyimide in a height of 10 µm on the active matrix substrate 1, followed by forming a transparent fluorine-based resin film by the dip coating method so as to form an insulating film 7 in a thickness of 0.2 µm on the surface of the active matrix substrate 1 having the first electrode 3 formed thereon.

On the other hand, a second electrode 4A and a third electrode 4B, which were arranged in the form of a stripe, were formed as common counter electrodes on a glass substrate 2 (second substrate) by the photolithography process. The second electrode 4A and the third electrode 4B were positioned 5 µm apart from each other, and each of these second and third electrodes 4A and 4B had a width of 20 µm.

An insulating liquid medium 6, having colored and charged fine particles 10 dispersed therein, was prepared as follows. Specifically, a carbon black having a particle diameter of 0.5 µm was used as the colored and charged fine particles 10, and Isopar G manufactured by Exxon Mobile Inc. was used as the insulating liquid medium 6. These colored and charged fine particles 10 and insulating liquid medium 6 were mixed such that the mixture contained 1% by weight of the colored and charged fine particles 10. Further, traces of a surfactant was added to the mixture for improving the dispersion stability.

The active matrix substrate 1 having the partition wall 5 formed thereon was coated by a dip coating method with the insulating liquid medium 6 having the colored and charged fine particles 10 dispersed therein so as to load the insulating liquid medium 6 in the pixel, followed by disposing the glass substrate 2 on the active matrix substrate 1 and subsequently bonding the glass substrate 2 to the active matrix substrate 1 by the contact bonding so as to obtain an electrophoretic display device.

A white plate was arranged on the back surface of the active matrix substrate 1 included in the electrophoretic display device thus manufactured so as to evaluate the optical characteristics of the electrophoretic display device. An AC voltage having an amplitude of 2V with 0V providing the center and a frequency of 30 Hz was applied in the reversed phase between the second electrode 4A and the third electrode 4B. In the first step, +10V was applied to the first electrode 3 so as to collect all the colored and charged fine particles 10 in the vicinity of the second electrode 4A and the third electrode 4B. The colored and charged fine particles 10 were efficiently collected by the electrophoretic effect in the vicinity of the second electrode 4A and the third electrode 4B so as to achieve a white display. When the voltage applied to the first electrode 3 was lowered to 0V, the colored and charged fine particles 10 collected in the vicinity of the second electrode 4A and the third electrode 4B were not allowed to migrate away from the region in the vicinity of the second electrode 4A and the third electrode 4B because of the dielectrophoretic effect, with the result that the white display was maintained. In this stage, the colored and charged fine particles 10 were slightly vibrated microscopically because the AC voltage was applied under the state that the colored and charged fine particles 10 were collected. Because of the vibration, the colored and charged fine particles 10 were not agglomerated and the dispersion was stabilized.

Then, the potential of the first electrode 3 was gradually changed from 0V to −10V. Before the potential was lowered to reach −2V, the colored and charged fine particles 10 were not allowed to migrate away from the region in the vicinity of the second electrode 4A and the third electrode 4B, with the result that the white display was maintained. When the potential of the first electrode 3 was further lowered to −2V or lower, some of the colored and charged fine particles 10 present in the vicinity of the second electrode 4A and the third electrode 4B began to be allowed to migrate slightly toward the first electrode 3. In accordance with migration of the colored and charged fine particles 10, the reflectance of the pixel region was gradually lowered. When the potential of the first electrode 3 was further lowered, most of the colored and charged fine particles 10 were allowed to migrate toward the first electrode 10, and the reflectance of the pixel was lowered to the minimum value at −8V so as to reach the saturation, with the result that the electrophoretic display device exhibited a black display.

When the potential of the first electrode 3 was brought back to 0V under the state noted above, the colored and charged fine particles 10, which were allowed to migrate to the region in the vicinity of the first electrode 3, were slightly vibrated by the AC voltage applied between the second electrode 4A and the third electrode 4B. However, the colored and charged fine particles 10 were not allowed to migrate on the average so as to maintain the black display. The white reflectance obtained during the white display was 60%, and the black reflectance obtained during the black display was 6%. It follows that the contrast was 10. Also, the response speed was found to be 100 milliseconds. Example 1 supports that the balance between the dielectrophoretic force and the electrophoretic force permits the colored and charged fine particles 10 to migrate with threshold characteristics imparted to the colored and charged fine particles 10 so as to make it possible to carry out the display.

EXAMPLE 2

Example 2 according to the fifth embodiment of the present invention will now be described. As shown in FIG. 1, used was an active matrix substrate 1 (first substrate) having a wiring and a thin film transistor (not shown) formed on a glass substrate. In the first step, an ITO film was formed as a first electrode 3 such that the first electrode 3 was electrically connected to the source electrode of the thin film transistor included in each pixel, followed by patterning the ITO film in the shape of the pixel electrode.

In the next step, a partition wall 5 was formed by using a photosensitive polyimide in a height of 30 µm on the active matrix substrate 1, followed by forming a transparent fluorine-based resin film by the dip coating method so as to form an insulating film 7 in a thickness of 0.2 µm on the surface of the active matrix substrate 1 having the first electrode 3 formed thereon.

On the other hand, a second electrode 4A and a third electrode 4B, which were arranged in the form of a stripe, were formed as common counter electrodes on a glass substrate 2 (second substrate) by the photolithography process. The second electrode 4A and the third electrode 4B were positioned 10 μm apart from each other, and each of these second and third electrodes 4A and 4B had a width of 20 μm.

An insulating liquid medium 6 having colored and charged fine particles 10 dispersed therein was prepared as follows. Specifically, a fine carbon black was added to a polystyrene resin used as a base material so as to control the conductance of the polystyrene resin, followed by allowing a pigment to be attached to the surface. The pigments used were colored cyan, magenta, and yellow so as to prepare three kinds of colored and charged fine particles. Further, the colored and charged fine particles were coated with a dielectric acrylic resin so as to prepare microcapsules. In this fashion, obtained were three kinds of the colored and charged fine particles 10 differing from each other in the color, the dielectric constant, and the conductance.

Isopar G manufactured by Exxon Mobile Inc. was used as the insulating liquid medium 6. These colored and charged fine particles 10 and insulating liquid medium 6 were mixed such that the mixture contained 1% by weight of the colored and charged fine particles 10. The mixing ratio of the colored and charged fine particles 10 for each color was controlled so as to achieve a black display. Further, traces of a surfactant were added to the mixture for improving the dispersion stability. As a result, the charged fine particles were charged positive. Also, for determining the dielectric characteristics shown in FIG. 6, the first frequency $f_1$ was set at 50 Hz, the second frequency $f_2$ was set at 300 Hz, and the third frequency $f_3$ was set at 1,000 Hz.

The active matrix substrate 1 having the partition wall 5 formed thereon was coated by a dip coating method with the insulating liquid medium 6 having the colored and charged fine particles 10 dispersed therein so as to load the insulating liquid medium 6 in the pixel, followed by disposing the glass substrate 2 on the active matrix substrate 1 and subsequently bonding the glass substrate 2 to the active matrix substrate 1 by the contact bonding so as to obtain an electrophoretic display device.

A white plate was arranged on the back surface of the active matrix substrate 1 included in the electrophoretic display device thus manufactured so as to evaluate the optical characteristics of the electrophoretic display device. An AC voltage having an amplitude of 2V with 0V providing the center and a frequency of 50 Hz was applied in the reversed phase between the second electrode 4A and the third electrode 4B. In the first step, +10V was applied to the first electrode 3 so as to collect all the colored and charged fine particles 10 in the vicinity of the second electrode 4A and the third electrode 4B. The colored and charged fine particles 10 were efficiently collected by the electrophoretic effect in the vicinity of the second electrode 4A and the third electrode 4B so as to achieve a white display. When the voltage applied to the first electrode 3 was lowered to 0V, the colored and charged fine particles 10 collected in the vicinity of the second electrode 4A and the third electrode 4B were not allowed to migrate away from the region in the vicinity of the second electrode 4A and the third electrode 4B because of the dielectrophoretic effect, with the result that the white display was maintained. In this stage, the colored and charged fine particles 10 were slightly-vibrated microscopically because the AC voltage was applied under the state that the colored and charged fine particles 10 were collected. Because of the vibration, the colored and charged fine particles 10 were not agglomerated and the dispersion was stabilized.

Then, the potential of the first electrode 3 was gradually changed from 0V to −10V. Before the potential was lowered to reach −2V, the colored and charged fine particles 10 were not allowed to migrate away from the region in the vicinity of the second electrode 4A and the third electrode 4B, with the result that the white display was maintained. When the potential of the first electrode 3 was further lowered to −2V or lower, some of the colored and charged fine particles 10 present in the vicinity of the second electrode 4A and the third electrode 4B began to be allowed to migrate slightly toward the first electrode 3. In accordance with migration of the colored and charged fine particles 10, the reflectance of the pixel region was gradually lowered so as to exhibit a cyan display. When the potential of the first electrode 3 was further lowered, some of the charged fine particles 10 that were colored cyan were allowed to migrate toward the first electrode 10, and most of the charged fine particles 10 that were colored cyan were allowed to migrate toward the first substrate 3 at −8V. Since the charged fine particles 10 that were colored magenta and yellow were not allowed to migrate away from the region in the vicinity of the second electrode 4A and the third electrode 4B because of the dielectrophoretic force, the color mixing did not take place so as to permit the charged fine particles 10 that were colored cyan to migrate.

In the next step, the frequency of the AC voltage applied between the second electrode 4A and the third electrode 4B was set at 300 Hz. Also, the potential of the first electrode 3 was changed from 0V to −10V. The charged fine particles 10 that were colored magenta began to be allowed to migrate at −2V or lower, and all the charged fine particles 10 that were colored cyan were allowed to migrate at −8V so as to exhibit a blue display.

Finally, the frequency of the AC voltage applied between the second electrode 4A and the third electrode 4B was set at 1,000 Hz. Also, the potential of the first electrode 3 was changed from 0V to −10V. The charged fine particles 10 that were colored yellow began to be allowed to migrate at −2V or lower, and all the charged fine particles 10 that were colored yellow were allowed to migrate at −8V so as to exhibit a black display.

When the potential of the first electrode 3 was brought back to 0V under the state noted above, the colored and charged fine particles 10 that were allowed to migrate to the region in the vicinity of the first electrode 3 were slightly vibrated by the AC voltage applied between the second electrode 4A and the third electrode 4B. However, the colored and charged fine particles 10 were not allowed to migrate on the average so as to maintain the black display. The white reflectance obtained during the white display was 60%, and the black reflectance obtained during the black display was 6%. It follows that the contrast was 10. Also, the response speed was found to be 100 milliseconds for the migration of the colored and charged fine particles 10 for each color. Example 2 supports that the balance between the dielectrophoretic force and the electrophoretic force permits the colored and charged fine particles 10 to migrate with threshold characteristics imparted to the colored and charged fine particles 10 so as to make it possible to carry out the display. Example 2 also supports that the colored and charged fine particles 10 for each color can be allowed to migrate with different threshold characteristics depending on the balance between the dielectrophoretic force and the electrophoretic force so as to make it possible to perform a color display.

As described above in detail, the present invention provides an electrophoretic display device, which permits easily generating the threshold value for allowing the charged fine particles to migrate and which can be driven with a low power consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrophoretic display device, comprising:
a first substrate and a second substrate positioned to face each other;
a first electrode mounted to the first substrate;
a second electrode and a third electrode, which are positioned to face the first electrode, each of the second electrode and the third electrode having an area smaller than that of the first electrode, and the distance between the second electrode and the third electrode being set shorter than each of the distance between the second electrode and the first electrode and the distance between the third electrode and the first electrode;
a suspension layer received in a space between the first electrode and each of the second and third electrodes, including insulating liquid medium and charged fine particles dispersed in the insulating liquid medium;
an AC power source configured to apply a first AC voltage between the second electrode and the third electrode to produce a first AC electrical field between the second electrode and the third electrode, the AC electrical field generating a dielectrophoretic force to restrict movement of the charged fine particles to remain in a region between the second electrode and the third electrode;
a DC power source configured to apply one of first and second DC voltages between the first electrode and each of the second and third electrodes to produce one of first and second DC electrical fields between the first electrode and each of the second and third electrodes;
a switching part configured to switch the one of the first and second DC voltages to the other of the first and second DC voltages to change the one of the first and second DC electrical fields to the other of the first and second DC electrical fields, the first electrical field generating a first electrophoretic force to migrate the charged fine particles dispersed in the insulating liquid medium to be restricted to the region between the second and third electrodes so that a color of the first electrode, or a film on the first electrode, is observed, and the second electrical field generating a second electrophoretic force against the dielectrophoretic force to disperse the charged fine particles in the insulating liquid medium to disperse beyond the region between the second and third electrodes so that a color of the dispersed fine particles is observed.

2. The electrophoretic display device according to claim 1, wherein the second electrode and the third electrode are mounted to the second substrate.

3. The electrophoretic display device according to claim 1, further comprising partition walls configured to partition the space between the first substrate and the second substrate.

4. The electrophoretic display device according to claim 1, wherein:
the AC power source selectively applies the first AC voltage having a first frequency f1 to the second and third electrodes; and
the charged fine particles have a value K1 determined by the following formula given below under the first frequency f1, the real number portion Re of the value K1 being set positive:

ti $K1 = Re[(\in 21 - \in 11)/(\in 21 + 2\in 11)]$ where $\in 11$ denotes the complex permittivity of the insulating liquid medium under the first frequency f1, and $\in 21$ denotes the complex permittivity of the charged fine particles under the first frequency f1, Re denotes the real number portion.

5. The electrophoretic display device according to claim 1, wherein:
the AC power source selectively supplies the first AC voltage and a second AC voltage which have a first frequency f1 and a second frequency f2, respectively, to the second electrode and the third electrode;
the charged fine particles include charged fine particles of a first color and a second color; and
the charged fine particles of the first color and the second color are charged in the same polarity, have values Ka1 and Ka2, Ka1 being larger than Ka2 (Ka1 >Ka2), which are determined by formulas (1) and (2) given below under the first frequency, and also have values Kb1 and Kb2, Kb1 being smaller than Kb2 (Kb1<Kb2), which are determined by formulas (3) and (4) given below under the second frequency:

$$Ka1 = Re[(\in 21 - \in 11)/(\in 21 + 2\in 11)] \quad (1)$$

$$Ka2 = Re[(\in 31 - \in 11)/(\in 31 + 2\in 11)] \quad (2)$$

$$Kb1 = Re[(\in 22 - \in 12)/(\in 22 + 2\in 12)] \quad (3)$$

$$Kb2 = Re[(\in 32 - \in 12)/(\in 32 + 2\in 12)] \quad (4)$$

where $\in 11$ and $\in 12$ denote the complex permittivity of the insulating liquid medium under the first and second frequencies f1 and f2, respectively, $\in 21$ and $\in 31$ denote the complex permittivity of the charged particles of the first color and the second color under the first frequency, respectively, $\in 22$ and $\in 32$ denote the complex permittivity of the charged particles of the first color and the second color under the second frequency, respectively, Re denotes the real number portion, and Ka1, Ka2, Kb1, and Kb2 are real numbers.

6. The electrophoretic display device according to claim 1, wherein the charged fine particles include charged fine particles that are colored cyan, charged fine particles that are colored yellow, and charged fine particles that are colored magenta.

7. The electrophoretic display device according to claim 1, wherein:
the AC power source section configured to apply selectively the first AC voltage, a second AC voltage and a third AC voltage which have first, second and third frequencies f1, f2 and f3, respectively, to the second electrode and the third electrode;
the charged fine particles include first, second and third charged fine particles of first, second and third colors;
the first, second and third charged fine particles are charged in the same polarity, the first, second and third fine particles have values K1(f1), K2(f1) and K3(f1) under the first frequency f1, respectively, which have the relationship of K1(f1)>K2(f1)>K3(f1);
the first, second and third fine particles have values K1(f2), K2(f2) and K3(f2) under the second frequency f2, respectively, which have the relationship of K2(f2)>K3(f2)>K1(f2);

the first, second and third fine particles have values $K1(f3)$, $K2(f3)$ and $K3(f3)$ under the third frequency f3, respectively, which have the relationship of $K3(f3)>K1(f3)>K2(f3)$;

wherein the values of $K1(f1)$, $K2(f1)$, $K3(f1)$, $K2(f2)$, $K3(f2)$, $K1(f2)$, $K3(f3)$, $K1(f3)$, and $K2(f3)$ are defined by the following equations:

$$Ki(f1)=Re[(\in i(f1)-\in 1q(f1))/(\in i(f1)+2\in 1q(f1))] \quad (1)$$

$$Ki(f2)=Re[(\in i(f1)-\in 1q(f2))/(\in i(f2)+2\in 1q(f2))] \quad (1)$$

$$Ki(f3)=Re[(\in i(f3)-\in 1q(f3))/(\in i(f3)+2\in 1q(f3))] \quad (1)$$

(i=1, 2, 3)

where $\in 1q(f1)$, $\in 1q(f2)$, and $\in 1q(f3)$, denote the complex permittivity of the insulating liquid medium under the frequencies f1, f2 and f3, respectively, $\in i(f1)$, $\in i(f2)$, and $\in i(f3)$ denotes the complex permittivity of the first, second, and third fine particles under the frequencies f1, f2, and f3.

8. The electrophoretic display device according to claim 7, wherein one of the first, second, and third colors corresponds to cyan, another one of the first, second, and third colors corresponds to yellow, and the remaining one of the first, second, and third colors corresponds to magenta.

9. A driving method of an electrophoretic display device including:

a first substrate and a second substrate positioned to face each other;

a first electrode mounted to the first substrate;

a second electrode and a third electrode, which are positioned to face the first electrode, each of the second electrode and the third electrode having an area smaller than that of the first electrode, and the distance between the second electrode and the third electrode being set smaller than each of the distance between the second electrode and the first electrode and the distance between the third electrode and the first electrode; and a suspension layer received in a space between the first electrode and each of the second and third electrodes, including an insulating liquid medium and charged fine particles dispersing in the insulating liquid medium;

the driving method comprising:

applying a first AC voltage between the second and third electrodes so as to impart a dielectrophoretic force to the charged fine particles, thereby restricting movement of the charged fine particles to remain in a region between the second and third electrodes;

applying one of first and second DC voltages between the first electrode and each of the second and third electrodes so as to impart a first electrophoretic force to migrate the charged fine particles dispersed in the insulating liquid medium to be restricted to the region between the second and third electrodes so that a color of the first electrode, or a film on the first electrode, is observed; and applying the other of the first and second DC voltages to impart a second electrophoretic force against the dielectrophoretic force to disperse the charged fine particles in the insulating liquid medium to disperse beyond the region between the second and third electrodes so that a color of the dispersed fine particles is observed.

10. The driving method according to claim 9, wherein:

the first AC voltage has a frequency f1; and the charged fine particles have a value K1 determined by the following formula given below under the first frequency f1, the real number portion Re of the value K1 being set positive:

$$K1=Re[(\in 21-\in 11)/(\in 21+2\in 11)]$$

where $\in 11$ denotes the complex permittivity of the insulating liquid medium under the first frequency f1, and $\in 21$ denotes the complex permittivity of the charged fine particles under the first frequency f1 respectively, Re denotes the real number portion.

11. The driving method according to claim 9, wherein:

the driving method further comprises applying a second AC voltage between the second and third electrodes so as to impart a second dielectrophoretic force to the charged fine particles, thereby restricting movement of the charged fine particles between the second and third electrodes;

the first and second AC voltages have a first frequency f1 and a second frequency f2, respectively;

the charged fine particles include first and second charged fine particles of first and second colors; and the first and second charged fine particles of the first and second colors are charged in the same polarity, have values Ka1 and Ka2, Ka1 being larger than Ka2 (Ka1>Ka2), which are determined by formulas (1) and (2) given below under the first frequency, and also have values Kb1 and Kb2, Kb1 being smaller than Kb2 (Kb1<Kb2), which are determined by formulas (3) and (4) given below under the second frequency:

$$Ka1=Re[(\in 21-\in 11)/(\in 21+2\in 11)] \quad (1)$$

$$Ka2=Re[(\in 31-\in 11)/(\in 31+2\in 11)] \quad (2)$$

$$Kb1=Re[(\in 22-\in 12)/(\in 22+2\in 12)] \quad (3)$$

$$Kb2=Re[(\in 32-\in 12)/(\in 32+2\in 12)] \quad (4)$$

where $\in 11$ and $\in 12$ denote the complex permittivity of the insulating liquid medium under the first and second frequencies f1 and f2, respectively, $\in 21$ and $\in 31$ denote the complex permittivity of the first and second charged particles of the first and second colors under the first frequency, respectively, $\in 22$ and $\in 32$ denote the complex permittivity of the first and second charged particles of the first and second colors under the second frequency, respectively, Re denotes the real number portion, and Ka1, Ka2, Kb1, and Kb2 are real numbers.

12. The driving method according to claim 9, wherein:

the charged fine particles include first charged fine particles that are colored cyan, second charged fine particles that are colored yellow, and third charged fine particles that are colored magenta.

13. The driving method according to claim 9, wherein:

the driving method further comprises applying a second AC voltage between the second and third electrodes so as to impart a second dielectrophoretic force to the charged fine particles, thereby restricting the charged fine particles between the second and third electrodes and applying a third AC voltage between the second and third electrodes so as to impart a third dielectrophoretic force to the charged fine particles, thereby restricting the charged fine particles between the second and third electrodes;

the first, second and third AC voltages have first, second and third frequencies f1, f2 and f3, respectively;

the charged fine particles include first, second and third charged fine particles of first, second and third colors; and the first, second and third charged fine particles are charged in the same polarity, the first, second and third fine particles have values K1(f1), K2(f1) and K3(f1) under the first frequency f1, respectively, which have the relationship of K1(f1)>K2(f1)>K3(f1);

the first, second and third fine particles have values K1(f2), K2(f2) and K3(f2) under the second frequency f2, respectively, which have the relationship of K2(f2)>K3(f2)>K1(f2);

the first, second and third fine particles have values K1(f3), K2(f3) and K3(f3) under the third frequency f3, respectively, which have the relationship of K3(f3)>K1(f3)>K2(f3);

wherein the values of K1(f1), K2(f1), K3(f1), K2(f2), K3(f2), K1(f2), K3(f3), K1(f3), and K2(f3) are defined by the following equations:

$$Ki(f1) = Re[(\epsilon i(f1) - \epsilon 1q(f1))/(\epsilon i(f1) + 2\epsilon 1q(f1))] \quad (1)$$

$$Ki(f2) = Re[(\epsilon i(f2) - \epsilon 1q(f2))/(\epsilon i(f2) + 2\epsilon 1q(f2))] \quad (1)$$

$$Ki(f3) = Re[(\epsilon i(f3) - \epsilon 1q(f3))/(\epsilon i(f3) + 2\epsilon 1q(f3))] \quad (1)$$

(i=1, 2, 3)

where $\epsilon 1q(f1)$, $\epsilon 1q(f2)$, and $\epsilon 1q(f3)$, denote the complex permittivity of the insulating liquid medium under the frequencies f1, f2 and f3, respectively, $\epsilon i(f1)$, $\epsilon i(f2)$, and $\epsilon i(f3)$ denotes the complex permittivity of the first, second, and third fine particles under the frequencies f1, f2, and f3.

14. The electrophoretic display device according to claim 13, wherein one of the first, second, and third colors corresponds to cyan, another one of the first, second, and third colors corresponds to yellow, and the remaining one of the first, second, and third colors corresponds to magenta.

* * * * *